(No Model.)
J. E. AUZAT.
CHOPPER.
No. 482,838.                Patented Sept. 20, 1892.
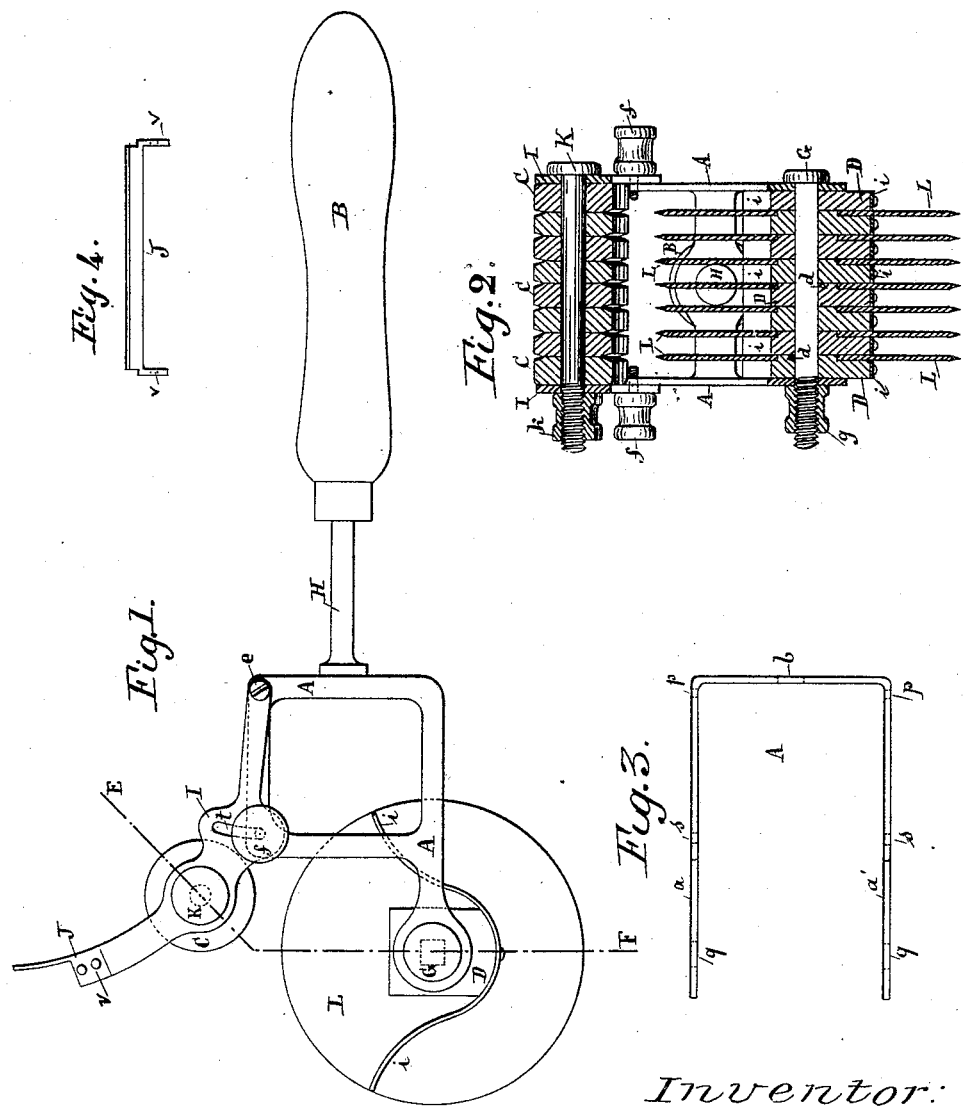
Witnesses
E. B. Bolton
E. K. Sturtevant.
Inventor:
Joseph Emile Auzat
By Richard
his Attorneys.

United States Patent Office.

JOSEPH EMILE AUZAT, OF CLERMONT-FERRAND, FRANCE.

CHOPPER.

SPECIFICATION forming part of Letters Patent No. 482,838, dated September 20, 1892.

Application filed May 20, 1892. Serial No. 433,790. (No model.) Patented in France June 17, 1890, No. 206,354; in Belgium November 10, 1890, No. 92,663, and in Spain November 19, 1890, No. 11,520.

*To all whom it may concern:*

Be it known that I, JOSEPH EMILE AUZAT, of Clermont-Ferrand, France, have invented certain new and useful Improvements in Cutters, of which the following is a full, clear, and exact description.

The object of my invention is to provide a cutter which is simple of construction, practically noiseless, and which automatically cleans and sharpens itself.

In order to make my invention more clearly understood, I have shown in the accompanying drawings means for carrying the same into practical effect.

Referring to said drawings, Figure 1 shows an elevation of a cutter embodying my invention. Fig. 2 is a section of the same on line E F of Fig. 1. Fig. 3 is a plan of the frame A. Fig. 4 is a plan of the scraper J.

Referring to the drawings, the sleeve D, bearing the disks or cutters L, is held between the two sides $a$ $a'$ of the frame A. At the forward ends of the parts $a$ $a'$ are two square holes $q$ $q$, adapted to receive a square rod G, supporting the sleeve D. This rod is provided at its extremity with a nut $g$. In $p$ $p$ are two screws $e$, holding the section I and serving as a pivot therefor. At the point $b$ is riveted an iron rod H, engaging in a wooden handle B. (See Figs. 1 and 4.) The holes $s$ $s$ of the frame receive the screws $f$ $f$, which pass in the grooves $t$ of the sector and are screwed in the frame A, maintaining the sector at any desired point. The sleeves D are pierced by a square hole to receive the square rod G and form a circular shoulder-piece $d$, in which the circular cutters L turn freely. (See Fig. 2.) At the lower part of the sleeves D are fixed cleaners $i$, Figs. 1 and 2. The cutters when turning are obliged to leave everything which might stick to it on the sides of the cleaner.

The grinder-frame I has fastened at its ends a scraper J, whose ears $v$ $v$ are turned over and riveted on the frame I. This scraper is used to bring back to one place the matter to be chopped, which always has a tendency to spread. This frame is provided with a round rod K, bearing the grinding-stones C, cut slopingly to receive the cutters, as indicated in Fig. 2. The rod K is held in the frame I by a nut K. By loosening the screws $f$ $f$ of the frame I it may swing in toward the cutters, and the rotation of either cutters or sharpening-disks will cause the peripheries of the cutters to engage the disks and sharpen the same.

Having thus described my invention, what I claim is—

1. In combination with a holding-frame, a series of stationary sleeves D, and a series of circular cutters held between the faces of adjacent sleeves and revolving thereon, substantially as described.

2. In combination with a holding-frame and a series of revolving cutters, and a series of cleaners interposed between the cutters, said cleaners being supported on a stationary part of the frame at their central portions, with their outer ends free, substantially as described.

3. The combination, with the cutting devices, of a movable sharpening apparatus consisting of frame I and a series of grinders adapted to be put in contact with the cutters L when desired, substantially as specified.

In testimony that I claim the foregoing I have hereunto set my hand.

JOSEPH EMILE AUZAT.

Witnesses:
VICTOR MATRAY,
FREDERIC MATRAY.